US012071920B2

(12) United States Patent
Ishiyama et al.

(10) Patent No.: US 12,071,920 B2
(45) Date of Patent: Aug. 27, 2024

(54) STARTING DEVICE FOR GENERAL-PURPOSE ENGINE AND GENERAL-PURPOSE ENGINE

(71) Applicant: MITSUBISHI HEAVY INDUSTRIES MEIKI ENGINES CO., LTD., Tsushima (JP)

(72) Inventors: Akihiro Ishiyama, Tsushima (JP); Takuya Endo, Tsushima (JP)

(73) Assignee: MITSUBISHI HEAVY INDUSTRIES MEIKI ENGINES CO., LTD., Aichi (JP)

( * ) Notice: Subject to any disclaimer, the term of this patent is extended or adjusted under 35 U.S.C. 154(b) by 0 days.

(21) Appl. No.: 18/021,736

(22) PCT Filed: Dec. 15, 2021

(86) PCT No.: PCT/JP2021/046189
§ 371 (c)(1),
(2) Date: Feb. 16, 2023

(87) PCT Pub. No.: WO2022/138359
PCT Pub. Date: Jun. 30, 2022

(65) Prior Publication Data
US 2024/0026847 A1 Jan. 25, 2024

(30) Foreign Application Priority Data
Dec. 23, 2020 (JP) ................................ 2020-213343

(51) Int. Cl.
*F02N 15/02* (2006.01)

(52) U.S. Cl.
CPC ................................ *F02N 15/022* (2013.01)

(58) Field of Classification Search
CPC .............................. F02N 15/022; F02N 11/00
See application file for complete search history.

(56) References Cited

U.S. PATENT DOCUMENTS

2014/0123928 A1* 5/2014 Iida ...................... F16F 15/265
123/192.2

FOREIGN PATENT DOCUMENTS

JP 46-29202 B1 8/1971
JP 46-35939 Y1 12/1971
(Continued)

OTHER PUBLICATIONS

Written Opinion of ISA (Year: 2022).*
(Continued)

*Primary Examiner* — Phutthiwat Wongwian
*Assistant Examiner* — Arnold Castro
(74) *Attorney, Agent, or Firm* — BIRCH, STEWART, KOLASCH & BIRCH, LLP

(57) ABSTRACT

A starting device for a general-purpose engine according to one embodiment includes: a starter motor; a pinion gear mounted on an output shaft of the starter motor; a camshaft gear mounted on a camshaft; a crankshaft gear mounted on a crankshaft and meshing with the camshaft gear; and a gear assembly configured to transmit a driving force of the starter motor via the pinion gear to the camshaft gear and configured not to transmit a driving force of the camshaft gear to the pinion gear. The pinion gear, the camshaft gear, the crankshaft gear, and the gear assembly are disposed in a crankcase in a state where the pinion gear meshes with a gear included in the gear assembly.

7 Claims, 2 Drawing Sheets

(56) References Cited

FOREIGN PATENT DOCUMENTS

| | | | |
|---|---|---|---|
| JP | 62-169 | U | 1/1987 |
| JP | 2-248653 | A | 10/1990 |
| JP | 6-16984 | Y2 | 5/1994 |
| JP | 11-280625 | A | 10/1999 |
| JP | 2000-186657 | A | 7/2000 |
| JP | 3659040 | B2 | 6/2005 |
| JP | 2007-239544 | A | 9/2007 |

OTHER PUBLICATIONS

International Preliminary Report on Patentability and Written Opinion of the International Searching Authority for International Application No. PCT/JP2021/046189, dated Jul. 6, 2023, with an English translation.

International Search Report and Written Opinion of the International Searching Authority for International Application No. PCT/JP2021/046189, dated Feb. 22, 2022.

* cited by examiner

View II-II

STARTING DEVICE FOR GENERAL-PURPOSE ENGINE AND GENERAL-PURPOSE ENGINE

TECHNICAL FIELD

The present disclosure relates to a starting device for a general-purpose engine and the general-purpose engine.

This application claims the priority of Japanese Patent Application No. 2020-213343 filed on Dec. 23, 2020, the content of which is incorporated herein by reference.

BACKGROUND

For example, in a general-purpose reciprocating engine, when the engine is started, cranking is performed manually or by a driving force from a starter motor.

For example, as a starting device for a general-purpose engine, a starting device is known which is configured such that a pinion gear mounted on an output shaft of a starter motor and a driven gear driven by the pinion gear mesh with each other when the engine is started and the mesh is released after the engine is started.

In the above-described starting device for the general-purpose engine, the pinion gear and the driven gear described above are generally disposed outside a crankcase in many cases. Consequently, a problem arises in that a foreign matter adhering to the pinion gear or the driven gear is bitten, resulting in wear of the pinion gear or the driven gear, or noise at startup is relatively large.

Further, a starting device is also known in which the pinion gear and the driven gear described above are disposed inside the crankcase (see, for example, Patent Document 1).

For example, as in the starting device described in Patent Document 1, if the pinion gear mounted on the output shaft of the starter motor and the driven gear driven by the pinion gear are disposed inside the crankcase, it is possible to suppress the above-described wear or noise.

CITATION LIST

Patent Literature

Patent Document 1: JP3659040B

SUMMARY

Technical Problem

However, in general, in order to rotate a crankshaft by a starter motor, it is necessary to reduce a rotation speed of a pinion gear with a relatively large speed reduction ratio, resulting in a relatively large gear or the like for transmitting a driving force of the pinion gear to the crankshaft. Thus, for example, as in the starting device described in Patent Document 1, if the pinion gear mounted on the output shaft of the starter motor and the driven gear driven by the pinion gear are disposed inside the crankcase, the size of the engine may increase due to, for example, an increase in size of the crankcase.

In view of the above, at least one embodiment of the present disclosure relates to the starting device for the general-purpose engine, and an object of at least one embodiment of the present disclosure is to provide a starting device that can be downsized while suppressing wear or noise.

Solution to Problem (1) A starting device for a general-purpose engine according to at least one embodiment of the present disclosure includes: a starter motor; a pinion gear mounted on an output shaft of the starter motor; a camshaft gear mounted on a camshaft; a crankshaft gear mounted on a crankshaft and meshing with the camshaft gear; and a gear assembly configured to transmit a driving force of the starter motor via the pinion gear to the camshaft gear and configured not to transmit a driving force of the camshaft gear to the pinion gear. The pinion gear, the camshaft gear, the crankshaft gear, and the gear assembly are disposed in a crankcase in a state where the pinion gear meshes with a gear included in the gear assembly.

(2) A general-purpose engine according to at least one embodiment of the present disclosure includes: the starting device having the above configuration (1).

Advantageous Effects

According to at least one embodiment of the present disclosure, it is possible to provide a starting device that can be downsized while suppressing wear or noise.

DETAILED DESCRIPTION

Figure 1:
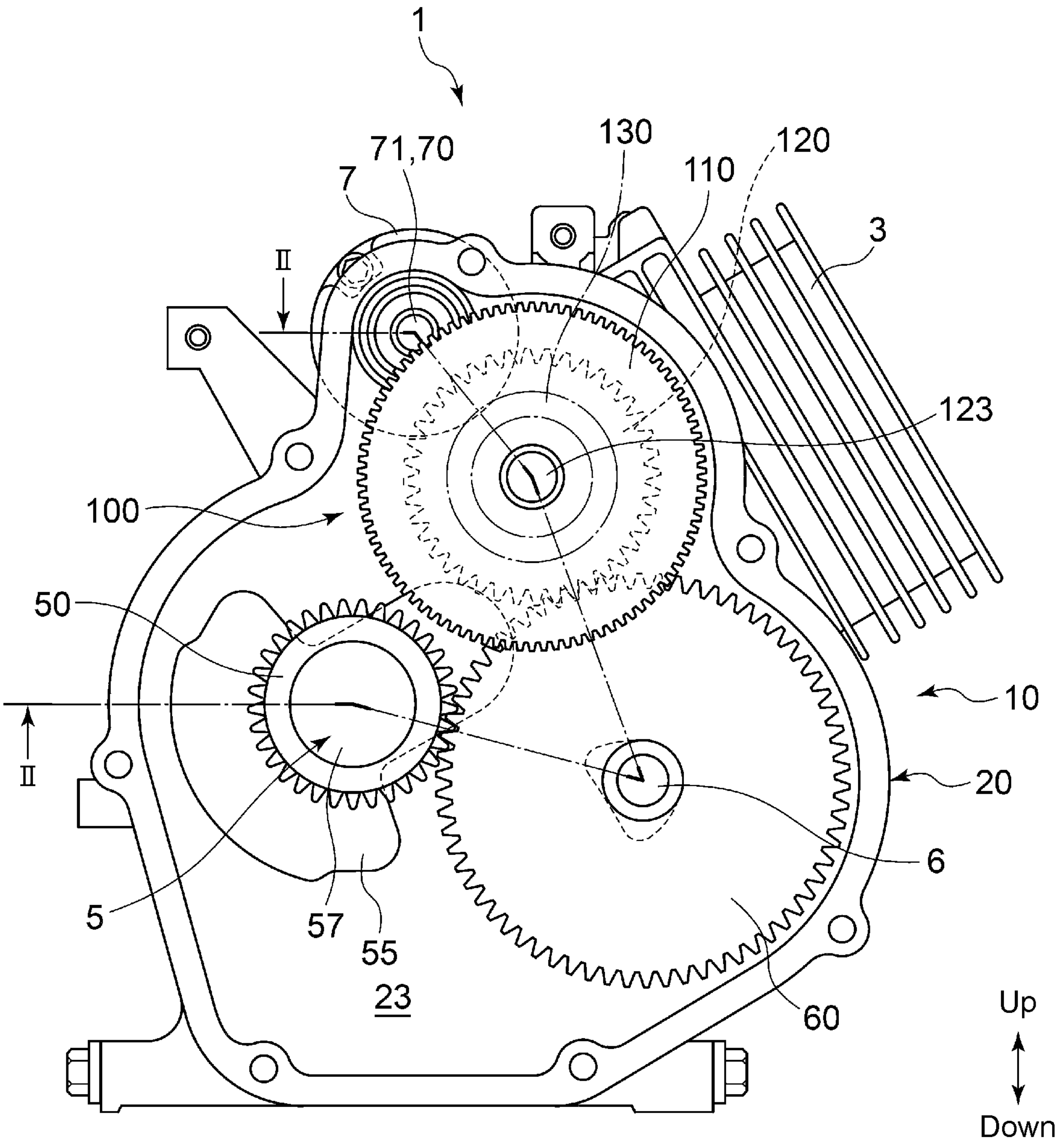
FIG. 1 is a view of an engine and a starting device as viewed from the axial direction of a crankshaft according to one embodiment.

Embodiments of the present disclosure will be described below with reference to the accompanying drawings. It is intended, however, that unless particularly identified, dimensions, materials, shapes, relative positions and the like of components described or shown in the drawings as the embodiments shall be interpreted as illustrative only and not intended to limit the scope of the present disclosure.

For instance, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same", "equal", and "uniform" shall not be construed as indicating only the state in which the feature is strictly equal, but also includes a state in which there is a tolerance or a difference that can still achieve the same function.

Further, for instance, an expression of a shape such as a rectangular shape or a tubular shape shall not be construed as only the geometrically strict shape, but also includes a shape with unevenness or chamfered corners within the range in which the same effect can be achieved.

On the other hand, the expressions "comprising", "including", "having", "containing", and "constituting" one constituent component are not exclusive expressions that exclude the presence of other constituent components.

FIG. 1 is a view of an engine and a starting device as viewed from the axial direction of a crankshaft according to one embodiment. For the sake of descriptive convenience, FIG. 1 shows a state in which a cylinder head, a crankcase which will be described later, or the like is removed.

Figure 2:
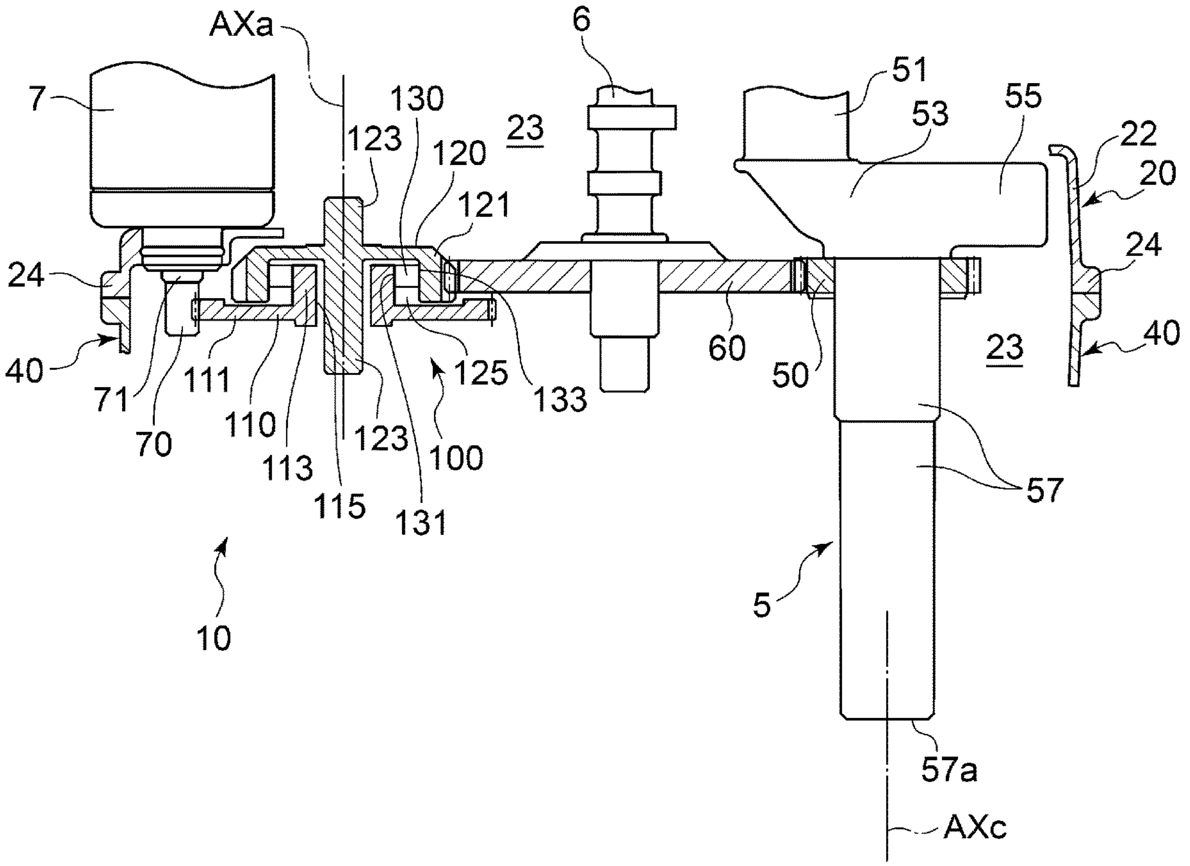
FIG. 2 is an arrow view taken along line II-II in FIG. 1.

FIG. 2 is an arrow view taken along line II-II in FIG. 1.

An engine 1 according to the one embodiment shown in FIGS. 1 and 2 is a general-purpose engine used as a power source for a work machine such as a generator, a pump, or a mower. The engine 1 according to the one embodiment is, for example, a single-cylinder four-cycle engine, and includes one cylinder 3, one piston (not shown) disposed in the cylinder 3, and one crankshaft 5 connected to the piston via a connecting rod (not shown). In the engine 1 according to the one embodiment shown in FIGS. 1 and 2, the vertical direction of the engine 1 is the same as the vertical direction shown in FIG. 1.

The engine 1 according to the one embodiment includes a starting device 10 which will be described in detail later. The starting device 10 according to the one embodiment is disposed on one end side of the crankshaft 5 (a front side of the drawing in FIG. 1 and a lower side of the drawing in FIG. 2), and is disposed integrally with the engine 1.

The engine 1 according to the one embodiment includes a cylinder block 20 and a crankcase 40. In the engine 1 according to the one embodiment, the cylinder block 20 includes a housing portion 22 which defines a space 23 for housing a crank pin 51, a crank arm 53, and a counterweight 55 of the crankshaft 5.

In the engine 1 according to the one embodiment, a lateral side of the housing portion 22, more specifically, a lateral side of the above-described one end side of the crankshaft 5 is open. That is, in the engine 1 according to the one embodiment, the housing portion 22 includes an opening portion 24 forming the opening.

In the engine 1 according to the one embodiment, the crankcase 40 mounted on a lateral side of the cylinder block 20 covers the opening formed by the opening portion 24.

That is, in the engine 1 according to the one embodiment, the crank pin 51, the crank arm 53, and the counterweight 55 of the crankshaft 5 are housed in the space 23 surrounded by a lower region of the cylinder block 20 and the crankcase 40 for closing an opening which opens to a lateral side of the lower region.

In the engine 1 according to the one embodiment, the crankcase 40 is formed so as to protrude from the opening portion 24 of the cylinder block 20 toward an end 57*a* on the above-described one end side along a central axis AXc of the crankshaft 5. Thus, the above-described space 23 expands in a direction in which the crankcase 40 protrudes from the opening portion 24 of the cylinder block 20 as described above.

In the engine 1 according to the one embodiment, a shaft portion 57 on the above-described one end side of the crankshaft 5 projects from the crankcase 40. Further, in the engine 1 according to the one embodiment, a shaft portion (not shown) on another end side of the crankshaft 5 projects from the housing portion 22 toward a side opposite to the shaft portion 57 on the one end side. In the engine 1 according to the one embodiment, a flywheel (not shown) is mounted on the shaft portion (not shown) on the above-described another end side of the crankshaft 5.

In the engine 1 according to the one embodiment, the shaft portion 57 on the above-described one end side of the crankshaft 5 is mounted with a crankshaft gear 50.

The engine 1 according to the one embodiment includes a camshaft 6 for driving an intake valve and an exhaust valve (not shown) via a rod (not shown), and a camshaft gear 60 mounted coaxially with the camshaft 6. In the engine 1 according to the one embodiment, the camshaft gear 60 meshes with the crankshaft gear 50.

The engine 1 according to the one embodiment includes a starter motor 7, a pinion gear 70 mounted on an output shaft 71 of the starter motor 7, and a gear assembly 100. In the engine 1 according to the one embodiment, the gear assembly 100 is configured to transmit a driving force of the starter motor 7 via the pinion gear 70 to the camshaft gear 60 and is configured not to transmit a driving force of the camshaft gear 60 to the pinion gear 70, as will be described in detail later.

The starting device 10 according to the one embodiment includes the starter motor 7, the pinion gear 70, the camshaft gear 60, the crankshaft gear 50, and the gear assembly 100 described above.

In the starting device 10 according to the one embodiment, the pinion gear 70, the camshaft gear 60, the crankshaft gear 50, and the gear assembly 100 are disposed in the crankcase 40, more specifically in the above-described space 23 in a state where the pinion gear meshes with a first gear 110 which is a gear included in the gear assembly 100.

As a conventional starting device for the general-purpose engine, a starting device is known which is configured such that a pinion gear mounted on an output shaft of a starter motor and a driven gear driven by the pinion gear mesh with each other when the engine is started and the mesh is released after the engine is started.

In the above-described conventional starting device for the general-purpose engine, the pinion gear and the driven gear described above are generally disposed outside the crankcase in many cases. Consequently, a problem arises in that a foreign matter adhering to the pinion gear or the driven gear is bitten, resulting in wear of the pinion gear or the driven gear, or noise at startup is relatively large.

With the starting device 10 according to the one embodiment, since the pinion gear and the first gear 110 included in the gear assembly 100 are disposed in the crankcase 40 in the meshed state, it is possible to reduce the noise from the starting device 10 when the engine 1 is started, and it is possible to suppress that these gears wear out by the foreign matter. Further, with the starting device 10 according to the one embodiment, since it is configured such that the driving force from the starter motor 7 is transmitted to the crankshaft 5 via the camshaft gear 60, the camshaft gear 60 provided in advance in the engine 1 is used as a part of the starting device 10. Thus, it is possible to reduce the size of the starting device 10.

Furthermore, with the engine 1 according to the one embodiment, since the starting device 10 according to the one embodiment is provided, it is possible to reduce the size of the starting device 10 as described above, and it is possible to suppress an increase in size of the engine 1.

Hereinafter, the starting device 10 according to the one embodiment will further be described.

In the starting device 10 according to the one embodiment, the gear assembly 100 includes the first gear 110 meshing with the pinion gear 70, a second gear 120 meshing with the camshaft gear 60, and a one-way clutch 130 capable of transmitting a driving force from the first gear 110 to the second gear 120.

More specifically, in the gear assembly 100 according to the one embodiment, the first gear 110 and the second gear 120 are coaxially arranged side by side along a central axis AXa.

In the gear assembly 100 according to the one embodiment, the first gear 110 includes a disk-shaped gear portion 111 which has teeth formed on an outer circumference to mesh with teeth of the pinion gear 70, and a cylindrical-shaped boss portion 113 projecting from the gear portion 111 toward the second gear 120 along the central axis AXa. The first gear 110 according to the one embodiment is formed with a through hole 115 penetrating the gear portion 111 and the boss portion 113 along the central axis AXa.

In the gear assembly 100 according to the one embodiment, the second gear 120 includes a disk-shaped gear portion 121 which has teeth formed on an outer circumference to mesh with teeth of the camshaft gear 60, and shaft portions 123 projecting from the gear portion 121 toward one side and another side of the central axis AXa along the central axis AXa. The second gear 120 according to the one embodiment is formed with a recess 125 recessed from the first gear 110 side toward the second gear 120 side along the central axis AXa. That is, in the second gear 120 according to the one embodiment, teeth meshing with the teeth of the camshaft gear 60 are formed on an outer circumferential portion of a cylinder having a bottomed cylindrical shape. In the second gear 120 according to the one embodiment, the shaft portions 123 project from both side surfaces of a disk portion corresponding to the bottom of the bottomed cylinder. In the second gear 120 according to the one embodiment, the recess 125 is formed by an inner circumferential surface of the cylinder having the bottomed cylindrical shape, a side surface of the disk portion corresponding to the bottom of the bottomed cylinder, and an outer peripheral surface of the shaft portion 123.

In the gear assembly 100 according to the one embodiment, the one-way clutch 130 has a structure where a unidirectional torque is transmitted between coaxial inner ring 131 and outer ring 133. In the gear assembly 100 according to the one embodiment, the one-way clutch 130 is disposed in the recess 125 of the second gear 120.

In the gear assembly 100 according to the one embodiment, an inner circumferential surface of the inner ring 131 of the one-way clutch 130 is fixed to an outer circumferential surface of the boss portion 113 of the first gear 110, and an outer circumferential surface of the outer ring 133 of the one-way clutch 130 is fixed to an inner peripheral surface of the recess 125 of the second gear 120, that is, the inner circumferential surface of the cylinder having the bottomed cylindrical shape. Therefore, in the gear assembly 100 according to the one embodiment, the boss portion 113 of the first gear 110 is in the state of getting into the recess 125 of the second gear 120.

In the gear assembly 100 according to the one embodiment, for example, a region of the shaft portion 123 of the second gear 120 projecting from the first gear 110 side toward the second gear 120 side is pivotally supported by the cylinder block 20 via a bearing (not shown), and a region projecting from the second gear 120 side toward the first gear 110 side is pivotally supported by the crankcase 40 via a bearing (not shown).

In the gear assembly 100, the first gear 110 and the second gear 120 may pivotally be supported with respect to a shaft member fixed to the cylinder block 20 and the crankcase 40.

In the starting device 10 according to the one embodiment, since the gear assembly 100 has the above-described configuration, the one-way clutch 130 exists on a power transmission path between the pinion gear 70 and the crankshaft gear 50. In the starting device 10 according to the one embodiment, the driving force from the starter motor 7 is transmitted in order of the output shaft 71, the pinion gear 70, the first gear 110, the one-way clutch 130, the second gear 120, the camshaft gear 60, the crankshaft gear 50, and the crankshaft 5.

In the gear assembly 100 according to the one embodiment, a transmission direction of the torque by the one-way clutch 130 is set such that the driving force from the starter motor 7 during cranking can be transmitted from the first gear 110 to the second gear 120. Therefore, even if the engine 1 is started during cranking and a rotation speed of the crankshaft 5 exceeds a speed at which the crankshaft 5 can be rotated by the driving force from the starter motor 7, the driving force from crankshaft 5 transmitted to the second gear 120 is blocked by the one-way clutch 130 and is not transmitted to the first gear 110. Thus, even if the engine 1 is started during cranking and the rotation speed of the crankshaft 5 exceeds the speed at which the crankshaft 5 can be rotated by the driving force from the starter motor 7, the driving force from crankshaft 5 is blocked by the one-way clutch 130 and is not transmitted to the starter motor 7. Further, even if the pinion gear 70 and the first gear 110 always mesh with each other, the driving force from the crankshaft 5 during operation of the engine 1 is blocked by the one-way clutch 130 and is not transmitted to the starter motor 7.

Since the general-purpose engine is often started while bearing a load of the work machine on which the general-purpose engine is mounted, kickback is likely to occur, which may damage the output shaft of the starter motor.

In the starting device 10 according to the one embodiment, the first gear has more teeth than the pinion gear.

Thus, the rotation speed of the pinion gear 70 is reduced by the first gear 110, making it possible to make a driving torque output from the first gear 110 larger than a driving torque output from the pinion gear 70. Therefore, with the starting device 10 according to the one embodiment, the reliability of starting the engine 1 is increased, the occurrence of kickback or the like is suppressed, and the risk of, for example, the damage to the output shaft 71 of the starter motor 7 can be reduced.

In the starting device 10 according to the one embodiment, the second gear 120 has less teeth than the camshaft gear 60.

Thus, the rotation speed of the second gear 120 is reduced by the camshaft gear 60, making it possible to make a driving torque output from the camshaft gear 60 larger than a driving torque output from the second gear 120. Therefore, with the starting device 10 according to the one embodiment, the reliability of starting the engine 1 is increased, the occurrence of kickback or the like is suppressed, and the risk of, for example, the damage to the output shaft 71 of the starter motor 7 can be reduced.

Thus, in the starting device 10 according to the one embodiment, the rotation speed of the pinion gear 70 is stepwise reduced by arranging the gear assembly 100 as described above, making it possible to stepwise make the driving torque output from the camshaft gear 60 larger than the driving torque output from the pinion gear 70. Therefore, it is possible to suppress an increase in size of each portion composing the transmission path of the driving force from the starter motor 7 in the starting device 10, making it possible to suppress an increase in size of the starting device 10.

In the starting device 10 according to the one embodiment, the pinion gear 70 has less teeth than the first gear 110. Further, in the starting device 10 according to the one embodiment, the second gear 120 has less teeth than the camshaft gear 60. Therefore, in the starting device 10 according to the one embodiment, the driving torque of the starter motor 7 is transmitted while gradually increasing during the process of being transmitted to the camshaft gear 60.

In the starting device 10 according to the one embodiment, the gear assembly 100 is configured such that the first gear 110 and the second gear 120 rotate at the same rotation speed, when the one-way clutch 130 transmits the driving force of the first gear 110 to the second gear 120.

More specifically, in the starting device 10 according to the one embodiment, the first gear 110 and the second gear 120 are coaxially arranged side by side along the central axis AXa, as described above. Then, in the starting device 10 according to the one embodiment, the one-way clutch 130 is disposed in the recess 125 of the second gear 120, the inner ring 131 and the boss portion 113 of the first gear 110 are fixed, and the outer ring 133 and the inner peripheral surface of the recess 125 of the second gear 120 are fixed.

Consequently, when the first gear 110 and the second gear 120 are connected via the one-way clutch 130, neither a speed increasing mechanism nor a speed reducing mechanism is required between the first gear 110 and the one-way clutch 130 and between the second gear 120 and the one-way clutch 130, making it possible to simplify the configuration of the gear assembly 100.

In the starting device 10 according to the one embodiment, in the gear assembly 100, the first gear 110 and the second gear 120 are coaxially arranged, as described above.

Thus, the configuration of the gear assembly 100 can be simplified compared to the case where the first gear 110 and the second gear 120 are not coaxially arranged.

The present disclosure is not limited to the above-described embodiments, and also includes an embodiment obtained by modifying the above-described embodiments or an embodiment obtained by combining these embodiments as appropriate.

For example, in the starting device 10 according to the one embodiment described above, the first gear 110 and the one-way clutch 130 are directly connected, but one or more gears may be interposed between the first gear 110 and the one-way clutch 130. Likewise, in the starting device 10 according to the one embodiment described above, the second gear 120 and the one-way clutch 130 are directly connected, but one or more gears may be interposed between the second gear 120 and the one-way clutch 130.

Further, for example, the engine 1 according to the one embodiment described above is, for example, the single-cylinder four-cycle engine, but may be an inline-engine engine or a V-type engine with two or more cylinders.

The contents described in the above embodiments would be understood as follows, for instance.

(1) A starting device 10 for a general-purpose engine (engine 1) according to at least one embodiment of the present disclosure includes: a starter motor 7; a pinion gear 70 mounted on an output shaft 71 of the starter motor 7; a camshaft gear 60 mounted on a camshaft 6; a crankshaft gear 50 mounted on a crankshaft 5 and meshing with the camshaft gear 60; and a gear assembly 100 configured to transmit a driving force of the starter motor 7 via the pinion gear 70 to the camshaft gear 60 and configured not to transmit a driving force of the camshaft gear 60 to the pinion gear 70. The pinion gear 70, the camshaft gear 60, the crankshaft gear 50, and the gear assembly 100 are disposed in a crankcase 40 in a state where the pinion gear 70 meshes with a first gear 110 which is a gear included in the gear assembly 100.

With the above configuration (1), since the pinion gear 70 and the first gear 110 included in the gear assembly 100 are disposed in the crankcase 40 in the meshed state, it is possible to reduce the noise from the starting device 10 when the engine 1 is started, and it is possible to suppress that these gears wear out by a foreign matter. Further, with the above configuration (1), since it is configured such that the driving force from the starter motor 7 is transmitted to the crankshaft 5 via the camshaft gear 60, the camshaft gear 60 provided in advance in the engine 1 is used as a part of the starting device 10. Thus, it is possible to reduce the size of the starting device 10.

(2) In some embodiments, in the above configuration (1), the gear assembly 100 includes a first gear 110 meshing with the pinion gear 70, a second gear 120 meshing with the camshaft gear 60, and a one-way clutch 130 capable of transmitting a driving force from the first gear 110 to the second gear 120.

With the above configuration (2), since the one-way clutch 130 exists on the power transmission path between the pinion gear 70 and the crankshaft gear 50, the driving force from the starter motor 7 when the engine is started can be transmitted to the crankshaft 5. Further, even if the rotation speed of the crankshaft 5 exceeds the speed at which the crankshaft 5 can be rotated by the driving force from the starter motor 7, the driving force from crankshaft 5 is blocked by the one-way clutch 130, which can prevent said driving force from being transmitted to the starter motor 7. Even if the pinion gear 70 and the first gear 110 always mesh with each other, the driving force from the crankshaft 5 during operation of the engine 1 is blocked by the one-way clutch 130, which can prevent said driving force from being transmitted to the starter motor 7.

(3) In some embodiments, in the above configuration (2), the first gear 110 preferably has more teeth than the pinion gear 70.

With the above configuration (3), the rotation speed of the pinion gear 70 is reduced by the first gear 110, making it possible to make a driving torque output from the first gear 110 larger than a driving torque output from the pinion gear 70.

(4) In some embodiments, in the above configuration (2) or (3), the second gear 120 preferably has less teeth than the camshaft gear 60.

With the above configuration (4), the rotation speed of the second gear 120 is reduced by the camshaft gear 60, making it possible to make a driving torque output from the camshaft gear 60 larger than a driving torque output from the second gear 120.

(5) In some embodiments, in any one of the above configurations (2) to (4), the gear assembly 100 is preferably configured such that the first gear 110 and the second gear 120 rotate at a same rotation speed, when the one-way clutch 130 transmits the driving force of the first gear 110 to the second gear 120.

With the above configuration (5), when the first gear 110 and the second gear 120 are connected via the one-way clutch 130, neither a speed increasing mechanism nor a speed reducing mechanism is required between the first gear 110 and the one-way clutch 130 and between the second gear 120 and the one-way clutch 130, making it possible to simplify the configuration of the gear assembly 100.

(6) In some embodiments, in any one of the above configurations (2) to (5), it is preferable that, in the gear assembly 100, the first gear 110 and the second gear 120 are coaxially arranged.

With the above configuration (6), the configuration of the gear assembly 100 can be simplified compared to the case where the first gear 110 and the second gear 120 are not coaxially arranged.

(7) An engine 1 according to at least one embodiment of the present disclosure includes: the starting device 10 having any one of the above configurations (1) to (6).

With the above configuration (7), it is possible to reduce the size of the starting device 10, making it possible to suppress an increase in size of the engine 1 of the starting device 10.

REFERENCE SIGNS LIST

1 Engine
5 Crankshaft
6 Camshaft
10 Starting device
20 Cylinder block
40 Crankcase
50 Crankshaft gear
60 Camshaft gear
70 Pinion gear
100 Gear assembly
110 First gear
120 Second gear
130 One-way clutch

The invention claimed is:

1. A starting device for a general-purpose engine, comprising:
a starter motor;
a pinion gear mounted on an output shaft of the starter motor;
a camshaft gear mounted on a camshaft;
a crankshaft gear mounted on a crankshaft and meshing with the camshaft gear; and
a gear assembly configured to transmit a driving force of the starter motor via the pinion gear to the camshaft gear and configured not to transmit a driving force of the camshaft gear to the pinion gear,
wherein the pinion gear, the camshaft gear, the crankshaft gear, and the gear assembly are disposed in a crankcase in a state where the pinion gear meshes with a gear included in the gear assembly.

2. The starting device for the general-purpose engine according to claim 1,
wherein the gear assembly includes a first gear meshing with the pinion gear, a second gear meshing with the camshaft gear, and a one-way clutch capable of transmitting a driving force from the first gear to the second gear.

3. The starting device for the general-purpose engine according to claim 2,
wherein the first gear has more teeth than the pinion gear.

4. The starting device for the general-purpose engine according to claim 2,
wherein the second gear has less teeth than the camshaft gear.

5. The starting device for the general-purpose engine according to claim 2,
wherein the gear assembly is configured such that the first gear and the second gear rotate at a same rotation speed, when the one-way clutch transmits the driving force of the first gear to the second gear.

6. The starting device for the general-purpose engine according to claim 2,
wherein, in the gear assembly, the first gear and the second gear are coaxially arranged.

7. A general-purpose engine, comprising:
the starting device according to claim 1.

* * * * *